United States Patent [19]

Goldmann

[11] Patent Number: 4,569,623
[45] Date of Patent: Feb. 11, 1986

[54] DUMP ASSEMBLY

[75] Inventor: Louis H. Goldmann, Benton City, Wash.

[73] Assignee: The United States of America as represented by the United States Department of Energy, Washington, D.C.

[21] Appl. No.: 678,913

[22] Filed: Dec. 6, 1984

[51] Int. Cl.⁴ .............................................. B65G 65/34
[52] U.S. Cl. .................................... 414/217; 222/162; 294/119.1; 414/303; 414/414; 414/415; 414/421
[58] Field of Search ................ 414/403, 414, 419–421, 414/217, 303, 291, 415; 222/162, 166; 294/119.1, 119.2; 193/17, 20, 22

[56] References Cited

U.S. PATENT DOCUMENTS 1,305,087  5/1919  Galloway .......................... 414/421
1,599,751  9/1926  Franken .............................. 414/414

Primary Examiner—Robert G. Sheridan
Attorney, Agent, or Firm—Edward W. Nypaver; Robert Southworth, III; Judson R. Hightower

[57] ABSTRACT

A dump assembly having a fixed conduit and a rotatable conduit provided with overlapping plates, respectively, at their adjacent ends. The plates are formed with openings, respectively, normally offset from each other to block flow. The other end of the rotatable conduit is provided with means for securing the open end of a filled container thereto. Rotation of the rotatable conduit raises and inverts the container to empty the contents while concurrently aligning the conduit openings to permit flow of material therethrough.

8 Claims, 4 Drawing Figures

DUMP ASSEMBLY

BACKGROUND OF THE INVENTION

This invention relates generally to a dump apparatus and, more particularly, to a rotatable dump apparatus for safely pouring toxic and/or radioactive powdered materials.

In the handling of toxic materials, such as radioactive materials, for example, strict accountability is required to preclude loss and/or misplacement of such materials and to prevent inadvertent human contact therewith. It is especially difficult to maintain proper accountability and prevent the spread of contaminants when handling bulk powdered materials. In a typical nuclear fuel fabricating facility, special nuclear powdered materials, such as uranium or plutonium oxides, must be poured from shipping containers or canisters into a hopper or the like of a fuel fabricating system. It is virtually impossible to prevent the escape of at least minute particulates of the radioactive powder during the pouring operation, thereby creating a hazardous and toxic environment.

Accordingly, it is a primary object of the present invention to obviate the above noted shortcomings by providing a dump apparatus for pouring or emptying hazardous or precious powdered materials from containers in a manner avoiding loss of such powdered materials.

It is another object of this invention to provide the foregoing dump apparatus with means for preventing the escape of any particulates while emptying the contents of a canister containing powdered material.

It is a further object of the present invention to provide the foregoing dump apparatus with closure means automatically operable upon dumping to control the passage of material therethrough.

These and other objects, advantages, and characterizing features of the present invention, will become clearly apparent from the ensuing detailed description of an illustrative embodiment thereof, taken together with the accompanying drawings wherein like reference numerals denote like parts throughout the various views.

SUMMARY OF THE INVENTION

A dump assembly is provided with a fixed conduit having an inlet and a rotatable conduit having at one end thereof an outlet alignable with said inlet. The other end of the rotatable conduit is provided with a gripper for securing the open end of a filled container thereto. A valve closure assembly includes overlapping plates affixed to the inlet and outlet of said conduits, respectively, and formed with openings normally offset from each other. Means are provided to rotate the rotary conduit to raise and invert the container while concurrently aligning said openings to empty the container of its contents and establish flow thereof by-gravity between said conduits.

DESCRIPTION OF THE PREFERRED EMBODIMENT

Figure 1:
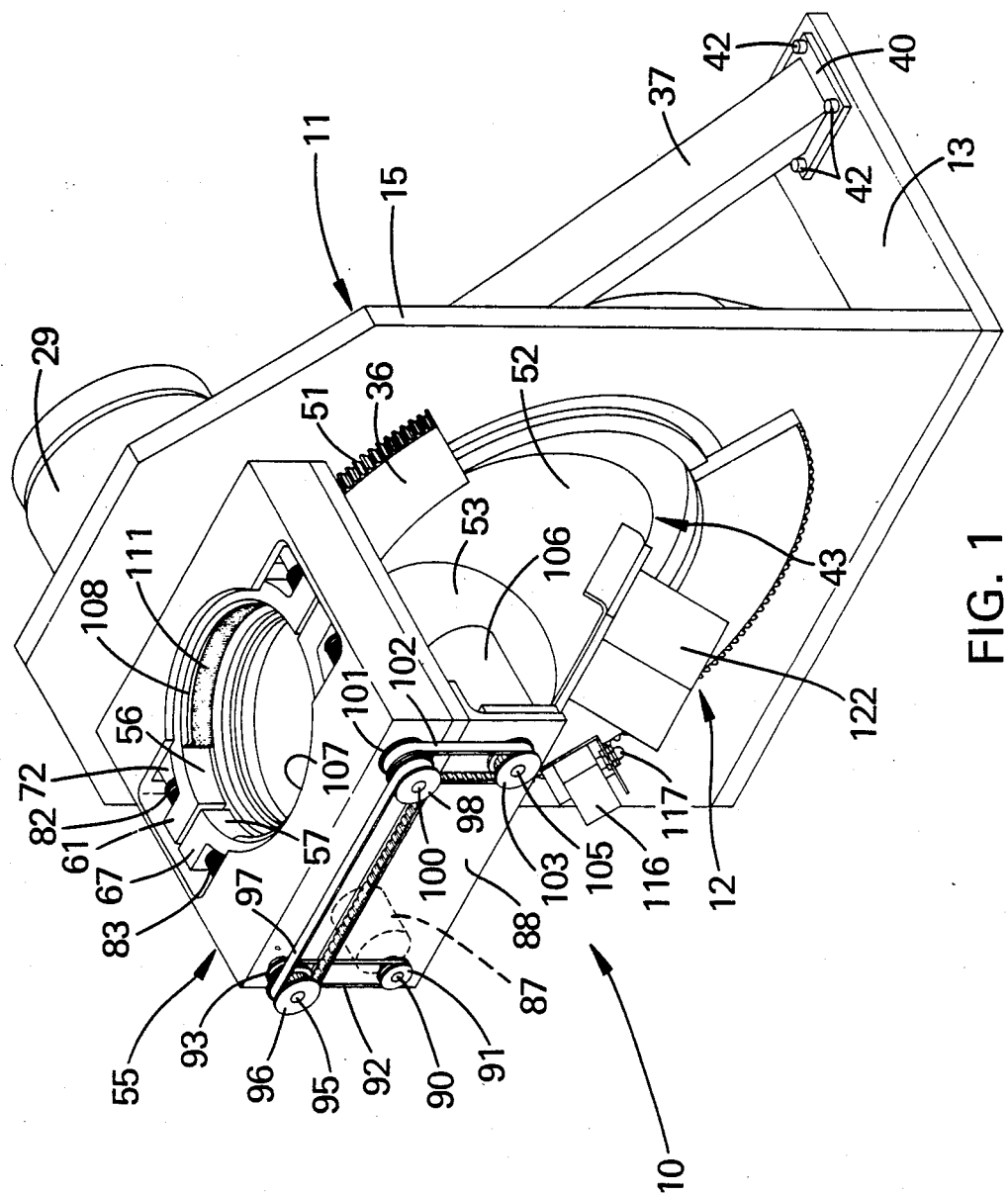
FIG. 1 is a perspective view of a dump apparatus constructed in accordance with this invention.

Referring now in detail to the illustrative embodiment depicted in the accompanying drawings, there is shown in FIG. 1 a dump apparatus, comprehensively designated 10, constructed in accordance with this invention and forming the first station of an automated nuclear fuel fabrication system (not shown). The dump apparatus 10 constitutes the first work station of several automated work stations in this fabrication system, which blends and processes the nuclear fuel powders poured into dump apparatus 10 and fabricates the blended powder into compact, sintered fuel pellets ultimately loaded in a stacked end-to-end relation into a thin-walled tube or cladding to form a nuclear fuel pin. Since the fabrication system downstream of the dump apparatus 10 forms no part of the present invention, no further amplification or description thereof is believed necessary.

The dump assembly 10 generally is comprised of a fixed section, generally designated 11, and a rotatable section, generally designated 12. The fixed section 11 includes a base plate 13 adapted to be anchored to a support pedestal (not shown) secured to the floor or ground surface. An upstanding support plate 15 is secured to base plate 13 by suitable fasteners 16 (FIG. 3) and is formed with a central cut-out section 14 to accommodate the conduit of the rotatable section 12 as will hereinafter be more fully described.

The flange 17 of a curved conduit 18 is secured to plate 15 by a series of circumferentially spaced fasteners 20. The fasteners 20 also secure an annular retaining ring 21 and a spacer plate 22 in place. The spacer plate 22 is interposed between flange 17 and retaining ring 21 and extends across the cut-out section 14 and the inlet 19 of conduit 18. This spacer plate 22 is formed with a semi-circular opening 23 and constitutes a part of a valve closure assembly 24 hereinafter more fully described. The retaining ring 21 maintains an annular bearing ring 25 in place.

The conduit 18 is formed of a series of segments 26 welded together and extending through an opening 27 formed in the base plate 13. The conduit 18 terminates at its lower end in a flanged outlet 28 adapted to be connected to a suitable piping system (not shown) located in a room below the dump assembly 10 and leading to a suitable hopper (also not shown) for further processing.

Figure 3:
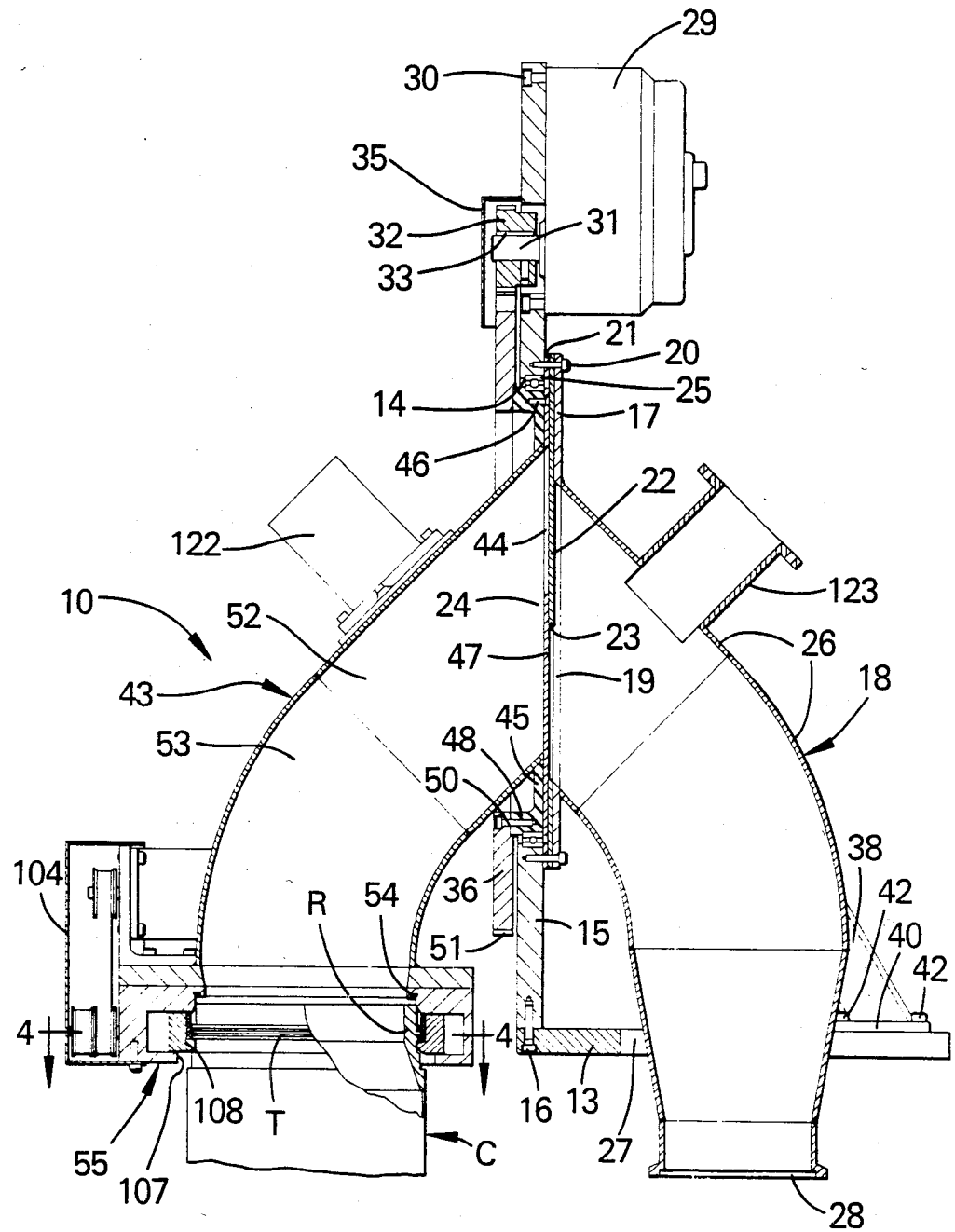
FIG. 3 is a vertical sectional view taken on the line 3—3 of FIG. 2.

As best shown in FIG. 3, an electric motor 29, connected to a suitable source of electric power, is rigidly mounted on the upper end of plate 15 by fasteners 30. The motor 29 has an output shaft 31 onto which is mounted a gear 32 by a key and slot arrangement 33. The gear 32 is enclosed within a housing guard 35 welded or otherwise fixedly secured to the upper end of plate 15. Gear 32 is adapted to mesh with and rotate a gear ring segment 36 for rotating section 12 as will hereinafter become apparent.

In order to properly support and reinforce upstanding plate 15, a pair of brace members 37 and 38 are provided, each formed at their opposite ends with flanges 40 and 41 for securement to the base plate 13 and the upper end of plate 15, respectively, by screws 42.

The rotatable section 12 includes a conduit 43 terminating at one end in a flange 45 secured by fasteners 46 to a spacer plate 47 constituting the other part of the valve closure assembly 24. The spacer plate 47 extends across the outlet of conduit 43 and is formed with a semi-circular opening 44. The flange 45 is supported for rotary movement relative to plate 15 by virtue of the bearing 25 interposed therebetween. The outer end of flange 45 is formed with an outwardly extending protrusion or rim 48 to which the ring gear segment 36 is affixed as by a plurality of fasteners 50. The gear ring segment 36 is formed with teeth 51 meshing with the drive gear 32 for rotating the section 12 about a horizontal axis to effect a dumping operation.

When conduit 43 is disposed in its lower position (the position shown in FIG. 3), the plate openings 44 and 23 of valve closure assembly 23 are offset from each other to interrupt communication between conduits 43 and 18 and block flow therebetween. When conduit 43, and thereby plate 47, is rotated to its upper position (FIG. 1), these openings 44 and 23 are aligned to form a passage establishing communication between conduits 43 and 18, allowing the flow of material therebetween.

The conduit 43 is formed of at least two tubular segments 52 and 53 welded together and having an arcuate configuration in side elevation. The inlet end (lower end as viewed in FIG. 3) of conduit 43 is provided with a gripper housing, generally designated 55, having an opening therein forming a continuation of conduit 43 and adapted to receive the open end of a container or canister C containing the powdered material to be emptied. An annular 0-ring seal 54 is disposed within the housing 55 and serves as a seat for engagement of the top of the canister C in a fluid tight relation.

Figure 4:
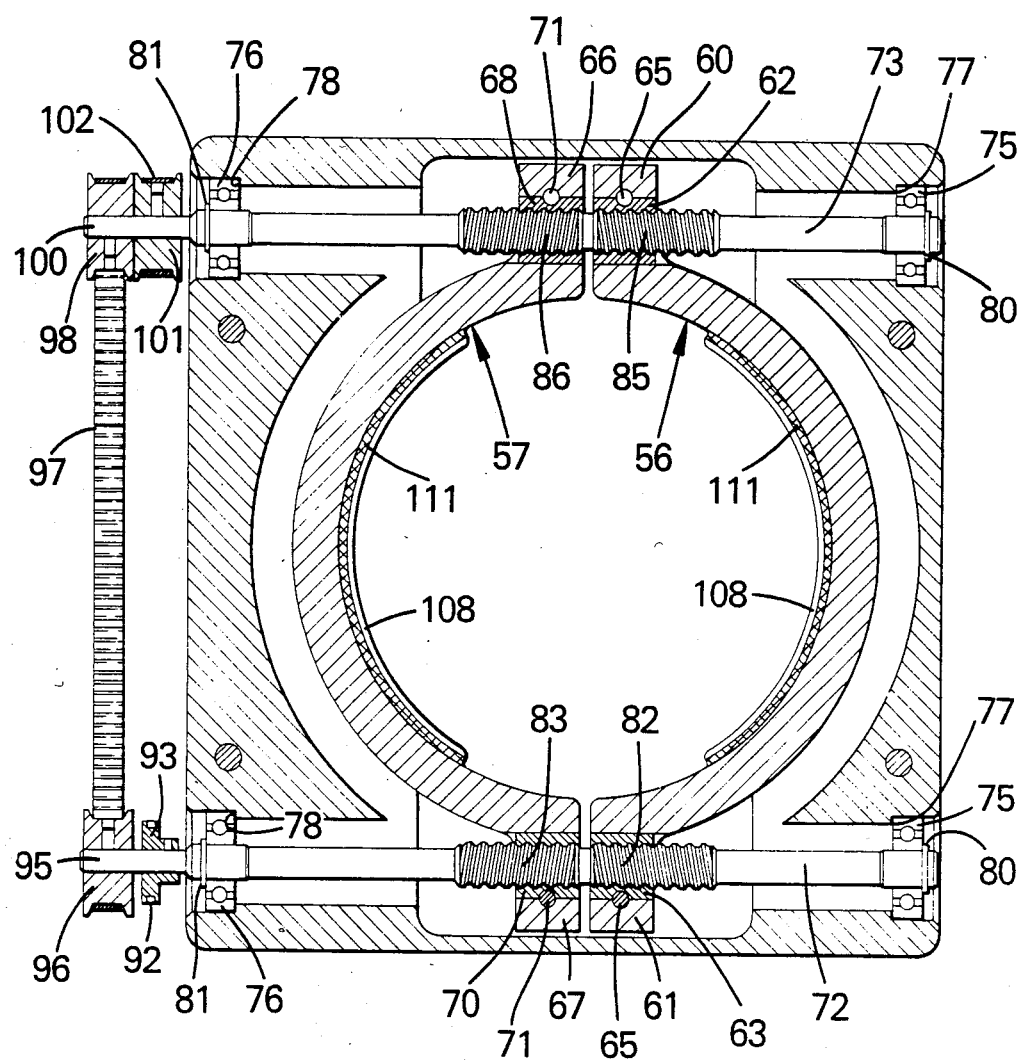
FIG. 4 is a horizontal sectional view, on an enlarged scale, taken along the line of 4—4 FIG. 3.

As best shown in FIG. 4, the gripper housing 55 comprises a pair of opposed semi-circular clamps 56 and 57 movable toward and away from each other for gripping and releasing the upper end of canister C. The clamp 56 is provided with a pair of radially outwardly projecting lugs 60 and 61 having nuts 62 and 63 provided therein and secured in place by dowel pins 65. Likewise, the clamp 57 is provided with a pair of lugs 66 and 67 having nuts 68 and 70 secured therein by dowel pins 71.

The means for moving or reciprocating clamps 56 and 57 includes a pair of shafts 72 and 73 journalled for rotation adjacent their respective opposite ends in bearings 75 and 76 secured in place between shoulders 77 and 78 formed in the housing 55 and retaining rings 80 and 81. Shaft 72 is provided with opposite hand threaded portions 82 and 83 engagable with the nuts 63 and 70. Likewise, shaft 73 is provided with opposite hand threaded portions 85 and 86 engagable with the nuts 62 and 68. Since the shafts 72 and 73 are affixed against axial movement, rotation thereof in the same direction effects axial movement of the associated nuts and thereby clamps 56 and 57 toward or away from each other in accordance with the direction of rotation of shafts 72 and 73.

The means for rotating shafts 72 and 73 includes an electric motor 87 (FIG. 1) connected to a suitable source of electric power and mounted on a structural angle member 88 connected to the gripper housing 55. The motor 87 is provided with an output shaft 90 having a gear-type drive pulley 91 (FIGS. 1 and 2) mounted thereon. A geared belt 92 is entrained about the drive pulley 91 and a gear-type pulley 93 affixed to an axial extension 95 forming a continuation of shaft 72. Another pulley 96 is mounted on extension 95 for receiving a timing belt 97 also entrained about pulley 98 mounted on an axial extension 100 forming a continuation of shaft 73. A second pulley 101 is mounted on extension 100 for receiving a timing belt 102 also entrained about a pulley 103 mounted on the shaft 105 of an encoder 106. Thus, the two shafts 72 and 73 are driven in unison via the pulley-belt drive train, in the same direction to effect movement of the clamps 56 and 57 toward each other or in the opposite direction to move the clamps away from each other. The pulley-belt drive train is enclosed within a suitable housing guard 104, the latter being removed in FIG. 1 for the sake of clarity.

The lower end of the gripper housing 55, as viewed in FIG. 3, is formed with an opening 107 for receiving the upper open end of the canister C, which is filled with the powdered material to be emptied. An inwardly projecting bead or lip 108 is formed along the lower arcuate edge of each clamp 56, 57 to support the flange F of canister C when inserted into the gripper housing 55. The configuration and dimensions of such lips, as well as the general shape of the inner surface of the clamps 56 and 57, can vary widely as dictated by the upper end configuration of the canister to be emptied. Each of the clamps 56 and 57 is provided along its inner periphery with a gripping surface formed of a layer 111 of resiliently yieldable elastomeric material engagable with the threaded portion T of canister C to prevent damage thereto.

As earlier noted, the motor 29 effects rotation of the rotary section 12 by means of a gear 32 and gear ring segment 36. The motor 29 is operative in conjuction with a brake motor 112 having a shaft 113 for supporting a gear 115 meshing with the teeth 51 of gear ring segment 36. Gear 115, along with gear 32, is enclosed within the protective housing guard 35. When deenergized, the brake motor 112 is effective to interlock gear 115 with gear ring segment 36 in a manner preventing rotation of the latter. Energizing the motor 112 releases the interlocking relationship to permit rotary movement of the gearing segment 36. Th brake motor 112 must be energized to allow motor 29 to drive the ring gear segment 36. The motor 29 and brake motor 112 are connected a suitable programmed controller (not shown) effective to energize and deenergize these motors in a predetermined, sequential prorammed manner.

Figure 2:
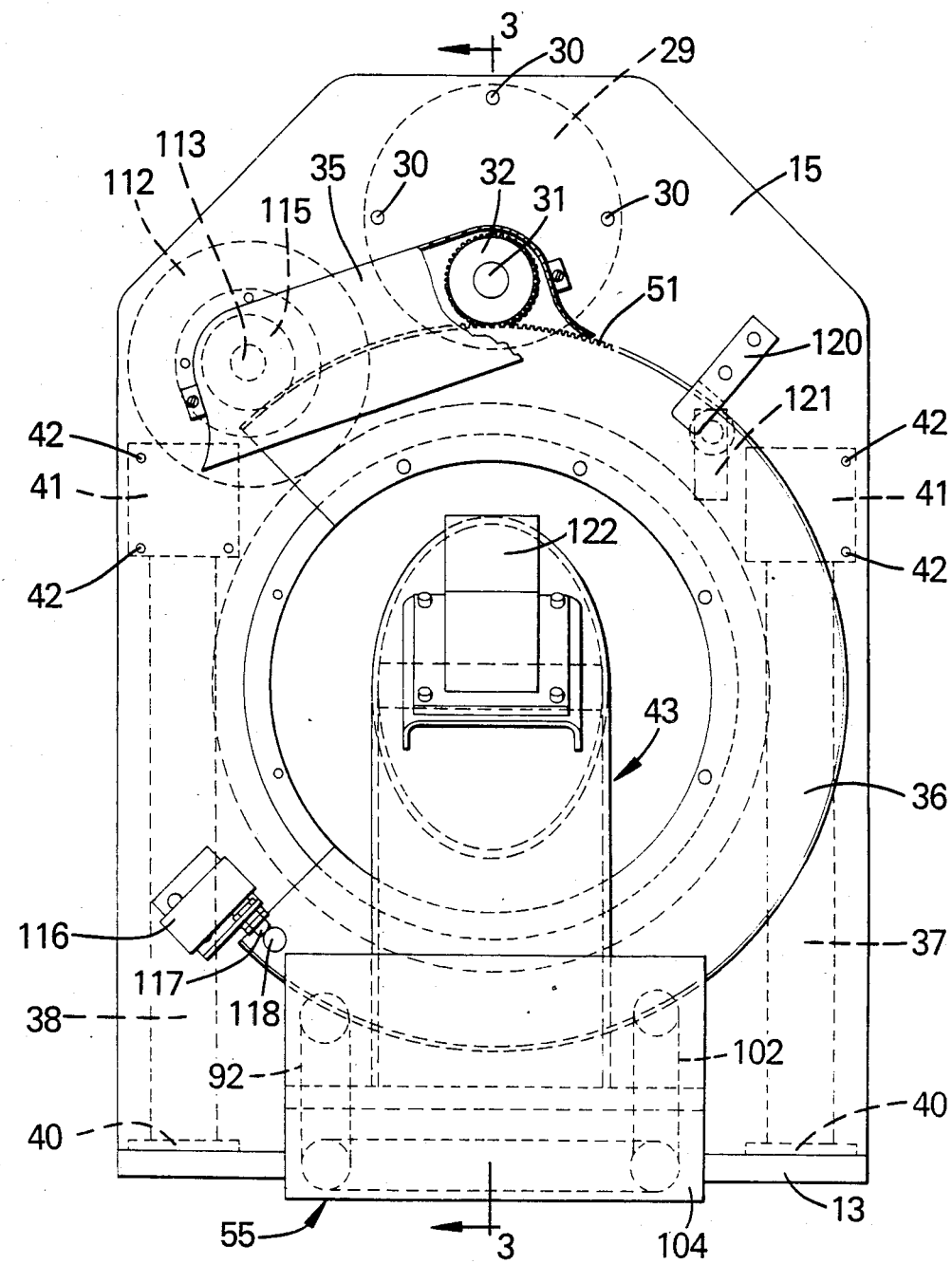
FIG. 2 is a front elevational view of the dump apparatus of FIG. 1.

A limit switch 116 is mounted on support plate 15 and is provided with a plunger 117 adapted to be engaged by an actuator lug 118 when the gear ring segment 36 reaches the end of its rotary movement in a clockwise direction as shown in FIG. 2. This positions the gripper housing 55 in its lower position. Rotary movement of the gear ring segment 36 in a counterclockwise direction is limited by a stop block 120 adapted to be engaged by the lug 118, thereby positioning the gripper housing 55 in its upper position. The stop block 120 also is mounted on support plate 15 diametrically opposite the limit switch 116 so as to confine rotary movement of the gear ring segment 36, and thereby gripper housing 55, approximately 180 degrees. A second limit switch 121 is mounted on the support plate 15 on the side opposite switch 116. These limit switches 116 and 121 signal the program controller and provide verification that the gripper housing 55 and the canister C secured therein have reached their lower and upper positions, respectively.

A vibrator 122, suitably connected to the programmed controller, is mounted on the conduit 43. The vibrator 122 becomes operative to impart vibratory motion to the conduit 43 as it is being rotated toward its upper position to loosen the powdered material and assist the flow thereof through conduits 43 and 18.

The encoder 106, earlier referred to, also is connected to the programmed controller and functions to generate a signal indicating the precise position of the gripper housing 55 at any instant during its travel between its lower and upper positions.

In order to further avoid the escape of any of the powdered material being handled by dump assembly 10, a vacuum environment is provided within the conduits 18 and 43 to maintain the interior thereof at subatmospheric pressures. Thus, any leakage occuring through the conduit system would be directed inwardly into the conduits rather than outwardly therefrom.

The means for providing the vacuum include a conduit section 123 welded or otherwise fixedly secured to a conduit section 26 and adapted to be coupled to a piping system (not shown) connected to a suitable source of vacuum (also not shown). A filter (not shown) can be attached to the interior of conduit section 123 for preventing the ingress of foreign particulates into the conduit system of dump assembly 10.

The mode of operation of dump assembly 10 is as follows:

With the rotatable section 12 in its lower position (FIGS. 1 and 2) and with the clamps 56 and 57 spaced sufficiently apart, a canister C is inserted into gripper housing 55 with the top of the canister C engaging against seal 54. The motor 87 is then energized to rotate, via the belt and pulley arrangement, the axially fixed shafts 72 and 73 in the same direction and, by virtue of the opposite hand threaded portions 82, 85 and 83, 86, move the associated nuts and clamps 56 and 57 toward each other for firmly gripping the rim R of the opened canister C therebetween. With the canister C securely gripped between clamps 56 and 57 in sealing relation with the conduit 43, motor 28 is energized to rotate, via gear 32 and gear ring segment 36, section 12 and conduit 43 about a horizontal axis perpendiculate to the plate 47 to lift the gripper housing 55 into its upper position. During such movement, the canister C is inverted for automatically pouring the powdered contents thereof into conduit 43. As conduit 43 is being rotated, the spacer plate 47 carried thereby also is rotated relative to the fixed spacer plate 22 to progressively open the closure valve assembly 24, allowing the powdered contents to flow therethrough by gravity to conduit 18 and ultimately to the hopper or other processing station disposed therebeneath. The valve closure assembly 24 is fully open when the inlet end of conduit 43 reaches its upper limit as dictated by stop block 120, and conduit 43 forms with conduit 18 a smooth, continuous passage for the free and easy flow of the container contents. Activation of the vibrator 122 assures complete emptying of the container contents and continued flow of material through the continuous passage defined by conduits 43 and 18 and prevents clinging of material to the inner surfaces thereof. Maintaining a vacuum within conduits 18 and 43 assists in preventing the escape of any powdered material outwardly of dump apparatus 10.

When the canister C is emptied, the motor 29 is reversed to rotate the ring gear segment 36 and attached conduit 43 in an opposite direction for returning the gripper housing 55 and attached canister to its lower position. The lug 118 on gear ring segment 36 actuates the plunger 117 to energize the limit switch 116 to close the circuit signaling the home or lower position of gripper housing 55. The motor 87 is then energized to effect opening or spreading apart of the clamps 56 and 57 to release the empty canister C therefrom. The apparatus 10 is now conditioned for receiving a loaded canister and the above described cycle is repeated.

At the time conduit 43 is being returned to its lower position, plate opening 44 is rotated out of registry with opening 23 to close valve assembly 24 and prevent the subsequent backflow of contaminated particulates upwardly through conduits 18 and 43 and outwardly into the ambient atmosphere when a container is not attached to the gripper housing 55.

Activation of the various motors and components herein mentioned are effected by the programmed controller for proper sequential operation as described above. Of course, in lieu of a computer programmed control, activation of these devices to obtain the foregoing sequence of operations can be effected by conventional limit switches and/or electrical timing arrangements operable when predetermined movements of the parts occur so that the termination of one operation sequentially triggers the initiation of the next suceeding operation.

While the dump assembly 10 of this invention has been conveniently described in connection with a system for handling and processing radioactive powdered materials, it should be understood that the subject dump assembly is in no way limited thereto, but has utility in any bulk material handling application where the formation of toxic or harmful dust is intolerable or where strict accountability is a requirement such as in the handling of precious metals or pharmaceuticals by way of example.

From the foregoing, it is apparent that the objects of the present invention have been fully accomplished. As a result of this invention, a dump apparatus is provided for emptying toxic and/or precious powdered materials from containers in a reliable and efficient manner while preventing the escape of such materials into the surrounding environment. By the provision of a valve closure assembly permitting flow of material only during a material pouring operation, backflow of hazardous particulates in suspension is precluded.

The foregoing description of a preferred embodiment of this invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of this invention and its practical application to thereby enable others skilled in the art to utilize the invention in various embodiments and with various modifications as are suited to the particular use contemplated. It is intended that the scope of the invention be defined by the claims appended hereto.

I claim:

1. A dump assembly comprising: a frame, a fixed conduit secured to said frame and having an inlet, a conduit rotatably mounted on said frame and having at one end thereof an outlet alignable with said inlet to form a continuous passage, means at the other end of said rotatable conduit for securing an open ended upright container thereon, a closure assembly comprised of overlapping plates affixed to the inlet and outlet of said fixed and rotatable conduits, respectively, said plates having openings normally offset from each other to block flow therethrough, and means for rotating said rotatable conduit to invert and raise said container and align said openings to permit flow of material by gravity from said container through said aligned openings.

2. A dump assembly according to claim 1, wherein said securing means comprises a housing affixed to said other end of said rotatable conduit and having an opening therethrough forming a continuation of said rotatable conduit, and a pair of opposed clamps in said housing movable transversely of said opening toward and away from each other for gripping and releasing said container.

3. A dump assembly according to claim 2, including a layer of resiliently yieldable material on the opposed gripping surfaces of said clamps engagable with the exterior of said container.

4. A dump assembly according to claim 2, including means for sealing said container to said housing in a leaktight relation.

5. A dump assembly according to claim 2, including drive means for moving said clamps transversely toward and away from each other.

6. A dump assembly according to claim 1, including a vibrator mounted on said rotatable conduit for facilitating material flow therethrough.

7. A dump assembly according to claim 1, including vacuum means connected to said fixed conduit for establishing subatmospheric pressures in said conduits.

8. A dump assembly according to claim 1, wherein said rotatable conduit is rotated about a horizontal axis perpendicular to the plane of the plate affixed to said outlet.

* * * * *